(12) United States Patent
Steger

(10) Patent No.: US 12,717,146 B2
(45) Date of Patent: Aug. 25, 2026

(54) AUGMENTED REALITY HEADSET WITH CONTROLLABLY DIMMABLE FILTER

(71) Applicant: Snap Inc., Santa Monica, CA (US)

(72) Inventor: Stephen Andrew Steger, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 19/173,246

(22) Filed: Apr. 8, 2025

(65) Prior Publication Data

US 2025/0237872 A1 Jul. 24, 2025

Related U.S. Application Data

(63) Continuation of application No. 18/301,729, filed on Apr. 17, 2023, now Pat. No. 12,298,514.

(51) Int. Cl.

*G02B 27/01* (2006.01)
*G02C 7/10* (2006.01)
*G06T 19/00* (2011.01)

(52) U.S. Cl.

CPC .......... *G02B 27/0172* (2013.01); *G02C 7/10* (2013.01); *G06T 19/006* (2013.01)

(58) Field of Classification Search

CPC ...... G02B 27/0172; G02C 7/10; G06T 19/006
USPC .......... 345/8
See application file for complete search history.

(56) References Cited

U.S. PATENT DOCUMENTS 5,638,195 A 6/1997 Katakura et al.
9,766,462 B1 9/2017 Worley et al.
10,578,877 B1 3/2020 Lin et al.
11,067,809 B1 7/2021 Sears et al.
12,027,101 B2 7/2024 Kim
12,033,382 B2 7/2024 Ko et al.
12,300,131 B2 5/2025 Nomine et al.
2008/0170018 A1 7/2008 Jones et al.
2009/0322891 A1 12/2009 Kondo et al.
2012/0068913 A1 3/2012 Bar-Zeev et al.

(Continued)

FOREIGN PATENT DOCUMENTS

WO 2021106749 6/2021

OTHER PUBLICATIONS

"U.S. Appl. No. 18/301,729, Advisory Action mailed Nov. 5, 2024", 5 pgs.

(Continued)

*Primary Examiner* — Kwin Xie
(74) *Attorney, Agent, or Firm* — Schwegman Lundberg & Woessner, P.A.

(57) ABSTRACT

An augmented reality system can include a headset frame wearable by a user. A window disposed in or on the headset frame can include adjacent first and second window regions. When the headset frame is worn by the user, a field of view of an eye of the user can extend through at least part of the first window region. A camera can be disposed in or on the headset frame. When the headset frame is worn by the user, the camera can have a field of view that is directed away from the user and through the second window region. A controllably dimmable filter can be located adjacent to the window in the field of view of the eye and the field of view of the camera. The controllably dimmable filter can have a controllable opacity that determines a visibility of the camera through the second window region.

20 Claims, 7 Drawing Sheets

(56) References Cited

U.S. PATENT DOCUMENTS

2012/0154277 A1* 6/2012 Bar-Zeev ............. G02B 27/017 345/158
2014/0313585 A1 10/2014 Jarvenpaa
2015/0042679 A1 2/2015 Järvenpää
2015/0131850 A1 5/2015 Qvarfordt
2016/0246055 A1 8/2016 Border et al.
2017/0199396 A1 7/2017 Knoll
2017/0315357 A1 11/2017 Katano et al.
2017/0323615 A1 11/2017 Hazra et al.
2017/0336641 A1* 11/2017 von und zu Liechtenstein ........... G06T 19/006
2018/0101988 A1* 4/2018 Murillo ................... G06F 3/011
2019/0004325 A1* 1/2019 Connor .............. G02B 27/0172
2019/0353908 A1 11/2019 Igarashi et al.
2020/0111259 A1 4/2020 Sears et al.
2021/0311310 A1 10/2021 Trisnadi et al.
2022/0004001 A1 1/2022 Danziger et al.
2022/0035157 A1 2/2022 Yokoyama
2022/0197026 A1 6/2022 Grant et al.
2022/0365370 A1* 11/2022 Singh ..................... G02C 7/101
2023/0129018 A1 4/2023 Zhu et al.
2025/0067982 A1* 2/2025 Jang ................... G02B 27/0093
2025/0180906 A1 6/2025 Mathur et al.

OTHER PUBLICATIONS

"U.S. Appl. No. 18/301,729, Corrected Notice of Allowability mailed Mar. 18, 2025", 4 pgs.
"U.S. Appl. No. 18/301,729, Examiner Interview Summary mailed Oct. 18, 2024", 3 pgs.
"U.S. Appl. No. 18/301,729, Final Office Action mailed Sep. 4, 2024", 26 pgs.
"U.S. Appl. No. 18/301,729, Non Final Office Action mailed May 21, 2024", 23 pgs.
"U.S. Appl. No. 18/301,729, Notice of Allowance mailed Jan. 8, 2025", 12 pgs.
"U.S. Appl. No. 18/301,729, Response filed Aug. 13, 2024 to Non Final Office Action mailed May 21, 2024", 15 pgs.
"U.S. Appl. No. 18/301,729, Response filed Oct. 23, 2024 to Final Office Action mailed Sep. 4, 2024", 11 pgs.
"U.S. Appl. No. 18/896,441, Non Final Office Action mailed Jun. 10, 2025", 9 pgs.
"U.S. Appl. No. 18/896,441, Examiner Interview Summary mailed Aug. 28, 2025", 2 pgs.
"U.S. Appl. No. 18/896,441, Response filed Aug. 29, 2025 to Non Final Office Action mailed Jun. 10, 2025", 11 pgs.
"U.S. Appl. No. 18/896,441, Non Final Office Action mailed Nov. 28, 2025", 9 pgs.
"U.S. Appl. No. 18/896,441, Response filed Jan. 27, 2026 to Non Final Office Action mailed Nov. 28, 2025", 13 pgs.
"U.S. Appl. No. 18/604,251, Non Final Office Action mailed Feb. 26, 2026", 14 pgs.
"U.S. Appl. No. 18/896,441, Non Final Office Action mailed Feb. 25, 2026", 11 pgs.
"U.S. Appl. No. 18/748,898, Non Final Office Action mailed Mar. 26, 2026", 43 pgs.
"Machine translation of WO/2021/106749A1, electronically from PE2E Search Mar. 23, 2026", (2021), 30 pgs.

* cited by examiner

AUGMENTED REALITY HEADSET WITH CONTROLLABLY DIMMABLE FILTER

FIELD OF THE DISCLOSURE

This application is a continuation of U.S. patent application Ser. No. 18/301,729, filed Apr. 17, 2023, which is incorporated by reference herein in its entirety.

FIELD OF THE DISCLOSURE

The present disclosure relates generally to augmented reality (AR) headsets.

BACKGROUND OF THE DISCLOSURE

Augmented reality (AR) headsets can be partially transparent. An AR headset can present visual information to a user, which can be superimposed on the user's view of the user's surroundings. There is ongoing effort to improve AR headsets.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting in any manner.

DETAILED DESCRIPTION

Figure 1:
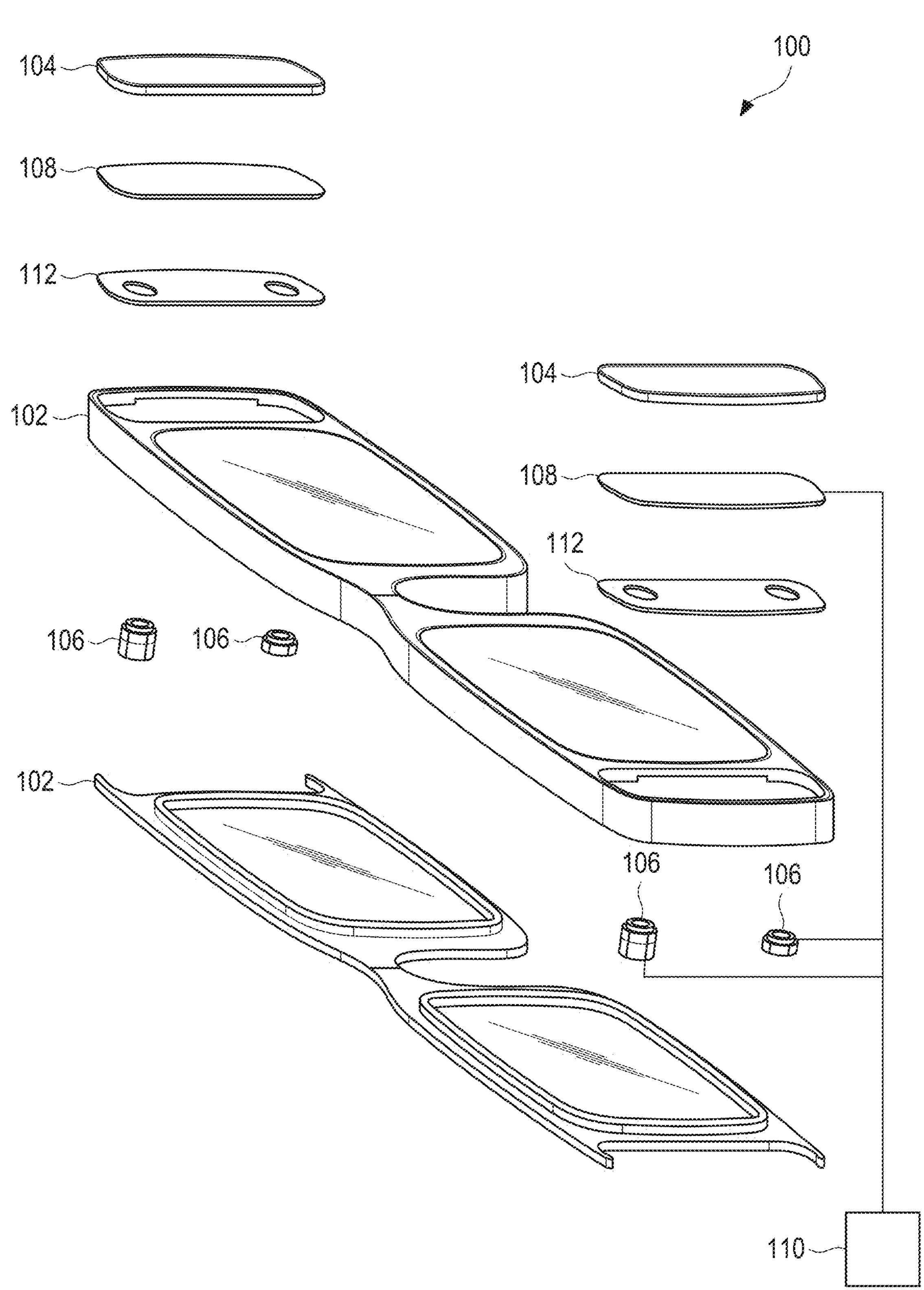
FIG. 1 shows an exploded view of an example of an augmented reality system.

An augmented reality (AR) and/or virtual reality (VR) headset may include one or more cameras, which can capture photos and/or video of the surroundings of a user, can sense depth of the surroundings, can track eyes, can track hands, can track bodies, or perform other functions. The one or more cameras can complicate an appearance of the headset, such that the headset appears less like traditional eyewear.

To simplify the appearance of the headset, the headset can hide the one or more cameras when possible. For example, the headset can locate the one or more cameras behind a controllably dimmable filter. The controllably dimmable filter can have a controllable opacity that determines a visibility of the one or more cameras. For example, the controllably dimmable filter can be opaque or substantially opaque when the one or more cameras are not operational, such that the one or more cameras may not be visible to other people when the one or more cameras are not being used. Hiding the one or more cameras when the one or more cameras are not in use can make the headset look more like regular glasses or eyewear and can simplify the headset design for improved industrial design.

In some examples, the controllably dimmable filter can hide the one or more cameras from view when the one or more cameras are not recording and can unhide or at least partially expose the one or more cameras when the one or more cameras are recording. Exposing the one or more cameras when the one or more cameras are recoding can at least partially address privacy concerns for people who might be recorded.

In some examples, the one or more cameras can use the controllably dimmable filter as a neutral density filter for creative effects in video or photo capture.

The controllably dimmable filter can be disposed behind (e.g., on the eye side) or in front (e.g., on the world side) of a window. In some examples, an opaque mask, film, or ink print on the window can hide other components behind the window in both the opaque (or substantially opaque) and transparent (or at least partially transparent) states.

The controllably dimmable filter can be segmented, which can create multiple independently controllable active areas for dimming. Using segmentation in this manner can optionally allow each camera to be revealed independently as needed.

In some examples, the controllably dimmable filter can be combined with a front cover lens (e.g., window) of the headset frame. In some examples, the controllably dimmable filter and the opaque mask can extend over some or all of the area of the front cover lens. In some examples, the front cover lens can utilize tinting or dimming for outdoor or bright environments, such as to improve comfort for the user and/or improved a display contrast.

In a specific example, an augmented reality system can include a headset frame wearable by a user. A window disposed in or on the headset frame can include adjacent first and second window regions. When the headset frame is worn by the user, a field of view of an eye of the user can extend through at least part of the first window region. A camera can be disposed in or on the headset frame. When the headset frame is worn by the user, the camera can have a field of view that is directed away from the user and through the second window region. A controllably dimmable filter can be located adjacent to the window in the field of view of the eye and the field of view of the camera. The controllably dimmable filter can have a controllable opacity that determines a visibility of the camera through the second window region.

FIG. 1 shows an exploded view of an example of an augmented reality system 100. The augmented reality system 100 can be configured as a headset. The augmented reality system 100 can include a headset frame 102 wearable by a user. The headset frame 102 can include a display and/or lens for each eye of the user. For simplicity, the following discussion pertains to one side of the headset, corresponding to a display for a single eye of the user. It will be understood that an additional display, corresponding to the other eye of the user, can optionally be formed in a similar manner to the display described below and optionally formed in a left-right mirror-image manner.

The augmented reality system 100 can include a window 104 disposed in or on the headset frame 102. The window 104 can be flat, can be curved in rotationally symmetric manner (e.g., with spherical curvature), or can include compound curvature in more than one axis. In some examples, a single window 104 can extend over the displays for both eyes. In some examples, the display for each eye can include its own window 104.

The augmented reality system 100 can include a camera 106 disposed in or on the headset frame 102. The camera 106 can be located such that when the headset frame 102 is worn by the user, the camera 106 has a field of view that is directed away from the user and through the window 104. In some examples, when the headset frame 102 is worn by the user, a field of view of the eye of the user can at least partially overlap with the field of view of the camera 106. In some examples, the window 104 can be located at an outermost portion of the headset frame 102, such as a leftmost portion for the user's left eye or a rightmost portion for the user's right eye. The window 104 may be at least partially out of the field of view of the eye of the user.

The augmented reality system 100 can include a controllably dimmable filter 108, such as a liquid crystal cell, located adjacent to the window 104 and in the field of view of the eye and further in the field of view of the camera 106. In some examples, the controllably dimmable filter 108 can be flexible and can be laminated to the window 104. In some examples, the controllably dimmable filter 108 can be laminated onto the eye side of the window 104. In other examples, the controllably dimmable filter 108 can be laminated onto the world side of the window 104. In some examples, when the headset frame 102 is worn by the user, the camera 106 can be located between the user and the controllably dimmable filter 108. In some examples, when the headset frame 102 is worn by the user, the controllably dimmable filter 108 can be located between the user and the window 104. In other examples, when the headset frame 102 is worn by the user, the window 104 can be located between the user and the controllably dimmable filter 108.

The controllably dimmable filter 108 can have a controllable opacity that determines a visibility of the camera 106 through the window 104. For example, when the controllably dimmable filter 108 is at least substantially opaque (e.g., 100% opaque, 95% opaque, 90% opaque, 80% opaque, 70% opaque, or another suitable value of opacity), the camera 106 may not be visually perceptible through the window 104. In other words, when the controllably dimmable filter 108 is at least substantially opaque, the controllably dimmable filter 108 can obscure the camera 106. When the controllably dimmable filter 108 is at least substantially opaque, the camera 106 can be obscured even in bright ambient lighting, such as in an outdoor environment.

In some examples, the augmented reality system 100 can optionally include multiple cameras 106. In some examples, at least two of the cameras 106 can be located behind the window 104. In some examples, at least two of the cameras 106 can be located behind different window regions, with the controllably dimmable filter 108 being controllably dimmable independently in the different window regions. In some examples, at least two of cameras 106 can be located behind different windows 104, with different controllably dimmable filters 108 being controllably dimmable independently in the different windows 104.

The augmented reality system 100 can include a controller 110. For example, the controller 110 can include one or more processors, and memory including instructions that, when executed by the one or more processors, cause the one or more processors to execute operations. In some examples, the operations can include one or more operations of method 700 (FIG. 7), or other suitable operations. The controller 110 can control the opacity of the controllably dimmable filter 108. In some examples, the controller 110 can control the opacity of the controllably dimmable filter 108 to hide the camera 106 when the camera 106 is inoperative. For example, when the camera 106 is activated, the controllably dimmable filter 108 can be at least partially transparent. When the camera 106 is not activated, the controllably dimmable filter 108 can be at least substantially opaque. For clarity, FIG. 1 omits electrical connections between the controller 110 and the one or more cameras 106 for the other eye, and an electrical connection between the controller 110 and the controllably dimmable filter 108 for the other eye.

The augmented reality system 100 can include an opaque mask 112 that extends circumferentially around the camera 106. The opaque mask 112 can hide from view one or more components of the headset, which can simplify an appearance of the headset. In some examples, the controllably dimmable filter 108 can be disposed between the opaque mask 112 and the window 104. In other examples, the opaque mask 112 can be disposed between the controllably dimmable filter 108 and the window 104.

Figure 2:
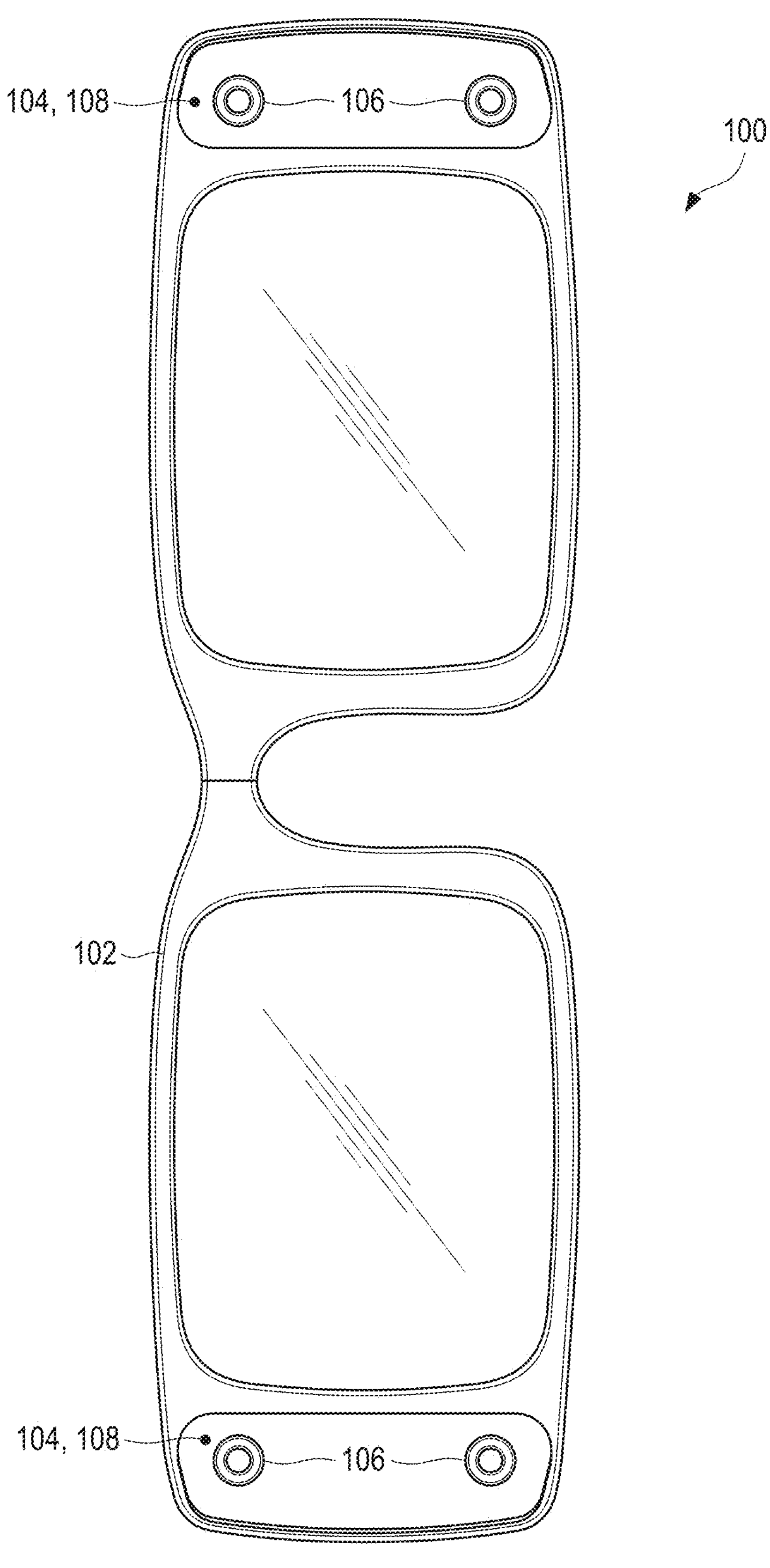
FIG. 2 shows a front view of the augmented reality system of FIG. 1, when the controllably dimmable filter is at least partially transparent.

FIG. 2 shows a front view of the augmented reality system 100 of FIG. 1, when the controllably dimmable filter 108 is at least partially transparent, such as when the camera 106 is activated. The camera 106 can be viewable through the controllably dimmable filter 108 and through the window 104.

Figure 3:
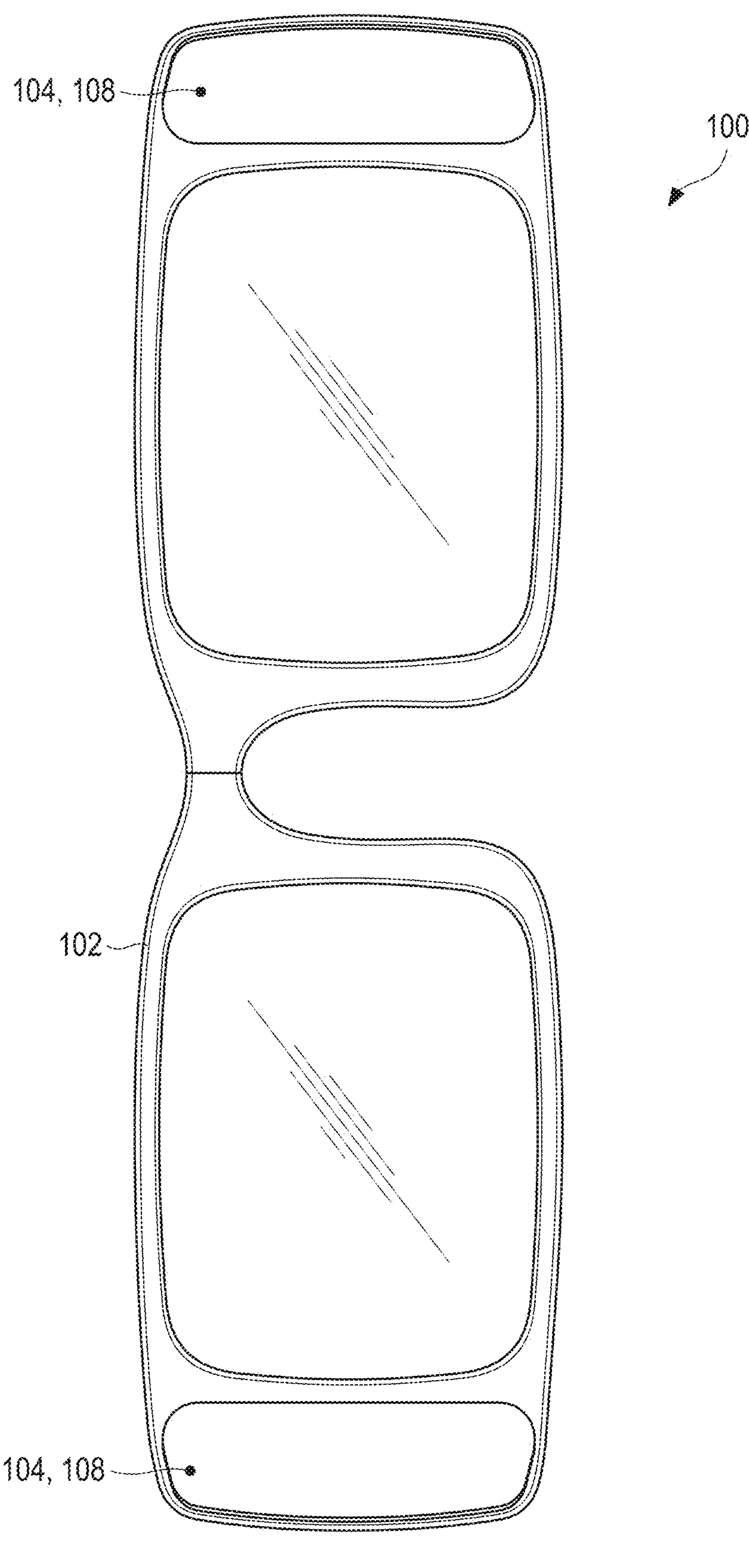
FIG. 3 shows a front view of the augmented reality system of FIG. 1, when the controllably dimmable filter is at least substantially opaque.

FIG. 3 shows a front view of the augmented reality system 100 of FIG. 1, when the controllably dimmable filter 108 is at least substantially opaque, such as when the camera 106 is not activated. The camera 106 may not be viewable through the controllably dimmable filter 108 and through the window 104.

Figure 4:
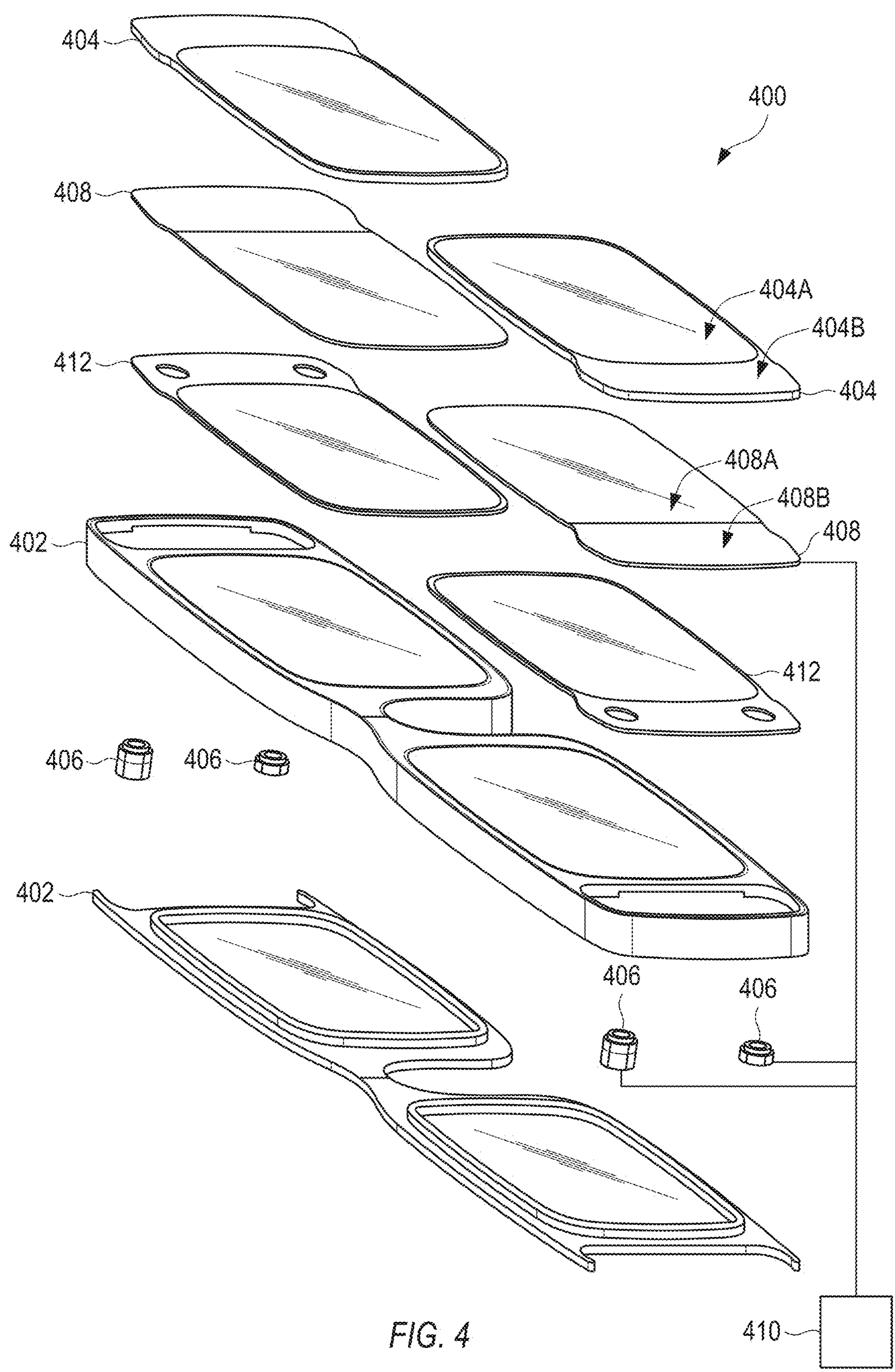
FIG. 4 shows an exploded view of an example of an augmented reality system.

FIG. 4 shows an exploded view of an example of an augmented reality system 400. The augmented reality system 400 can be configured as a headset. The augmented reality system 400 can include a headset frame 402 wearable by a user. The headset frame 402 can include a display and/or lens for each eye of the user. For simplicity, the following discussion pertains to one side of the headset, corresponding to a display for a single eye of the user. It will be understood that an additional display, corresponding to the other eye of the user, can optionally be formed in a similar manner to the display described below and optionally formed in a left-right mirror-image manner.

The augmented reality system 400 can include a window disposed in or on the headset frame 402. The window 404 can be flat, can be curved in rotationally symmetric manner (e.g., with spherical curvature), or can include compound curvature in more than one axis. In some examples, a single window 404 can extend over the displays for both eyes. In some examples, the display for each eye can include its own window 404. The window 404 can include a first window region 404A and a second window region 404B adjacent to the first window region 404A.

The first window region 404A can be located such that when the headset frame 402 is worn by the user, a field of view of an eye of the user extends through at least part of the first window region 404A. For example, the augmented reality system 400 can have a display that is at least partially transparent in first window region 404A. In other words, the user's eye can look through the first window region 404A of the window 404 to observe the user's surroundings.

The augmented reality system 400 can include a camera 406 disposed in or on the headset frame 402. The camera 406 can be located such that when the headset frame 402 is worn by the user, the camera 406 has a field of view that is directed away from the user and through the second window region 404B. In some examples, when the headset frame 402 is worn by the user, the field of view of the eye of the user can at least partially overlap with the field of view of the camera 406. In some examples, the second window region 404B can be located at an outermost portion of the headset frame 402, such as a leftmost portion for the user's left eye or a rightmost portion for the user's right eye. The second window region 404B may be at least partially out of the field of view of the eye of the user.

The augmented reality system 400 can include a controllably dimmable filter 408, such as a liquid crystal cell, located adjacent to the window 404 and in the field of view of the eye and further in the field of view of the camera 406. In some examples, the controllably dimmable filter 408 can be flexible and can be laminated to the window 404. In some examples, the controllably dimmable filter 408 can be laminated onto the eye side of the window 404. In other examples, the controllably dimmable filter 408 can be laminated onto the world side of the window 404. In some examples, when the headset frame 402 is worn by the user, the camera 406 can be located between the user and the controllably dimmable filter 408. In some examples, when the headset frame 402 is worn by the user, the controllably dimmable filter 408 can be located between the user and the window 404. In other examples, when the headset frame 402 is worn by the user, the window 404 can be located between the user and the controllably dimmable filter 408.

In some examples, the augmented reality system 400 can optionally include multiple cameras 406. In some examples, at least two of the cameras 406 can be located behind the second window region 404B. In some examples, at least two of the cameras 406 can be located behind different window regions, with the controllably dimmable filter 408 being controllably dimmable independently in the different window regions.

The controllably dimmable filter 408 can have a controllable opacity that determines a visibility of the camera 406 through the second window region 404B. For example, when the controllably dimmable filter 408 is at least substantially opaque, the camera 406 may not be visually perceptible through the second window region 404B. In other words, when the controllably dimmable filter 408 is at least substantially opaque, the controllably dimmable filter 408 can obscure the camera 406. When the controllably dimmable filter 408 is at least substantially opaque, the camera 406 can be obscured even in bright ambient lighting, such as in an outdoor environment.

When the headset frame 402 is worn by the user, the controllable opacity can further determine an amount of light transmitted through the first window region 404A to the eye of the user. For example, the controllably dimmable filter 408 can dim the first window region 404A when the ambient light is excessively bright, such as to improve a comfort of the user, in a manner like sunglasses. Further, the controllably dimmable filter 408 can dim all or one or more portions of the first window region 404A to improve contrast with augmented reality graphic elements displayed by the headset. For example, for a graphic element overlaid on an object in a field of view of the eye of the user, the controllably dimmable filter 408 can optionally dim a portion of the field of view corresponding to the object or an area around or near the object, which can increase a contrast of the graphic element.

The augmented reality system 400 can include a controller 410. For example, the controller 410 can include one or more processors, and memory including instructions that, when executed by the one or more processors, cause the one or more processors to execute operations. In some examples, the operations can include one or more operations of method 700 (FIG. 7), or other suitable operations. The controller 410 can control the opacity of the controllably dimmable filter 408.

In some examples, the controllably dimmable filter 408 can include a single filter region that can simultaneously determine an amount of light transmitted through the first window region 404A and determine an amount of light transmitted through the second window region 404B. For clarity, FIG. 4 omits electrical connections between the controller 410 and the one or more cameras 406 for the other eye, and an electrical connection between the controller 410 and the controllably dimmable filter 408 for the other eye.

In other examples, the controllably dimmable filter 408 can include a first filter region 408A located to determine an amount of light transmitted through the first window region 404A and a second filter region 408B located to determine an amount of light transmitted through the second window region 404B. The first filter region 408A and the second filter region 408B can be independently controllable.

In some examples, the controller 410 can control the opacity of the controllably dimmable filter 408 to hide the camera 406 when the camera 406 is inoperative. For example, when the camera 406 is activated, the controllably dimmable filter 408 can be at least partially transparent in the second filter region 408B. When the camera 406 is not activated, the controllably dimmable filter 408 can be at least substantially opaque in the second filter region 408B.

In some examples, the controller 410 can control the opacity of the controllably dimmable filter 408 to improve a contrast of one or more graphical elements displayed by the augmented reality system 400. For example, the controller 410 can control the opacity of the controllably dimmable filter 408 at least in part in response to data corresponding to an image generated by the camera 406. In some examples, increasing intensity in the image can cause the controllably dimmable filter 408 to become opaquer in the first filter region 408A. In some examples, decreasing intensity in the image can cause the controllably dimmable filter 408 to become more transparent in the first filter region 408A.

The augmented reality system 400 can include an opaque mask 412 that extends circumferentially around the first window region 404A and extends circumferentially around the second window region 404B. The opaque mask 412 can hide from view one or more components of the headset, which can simplify an appearance of the headset. In some examples, the controllably dimmable filter 408 can be disposed between the opaque mask 412 and the window 404. In other examples, the opaque mask 412 can be disposed between the controllably dimmable filter 408 and the window 404.

Figure 5:
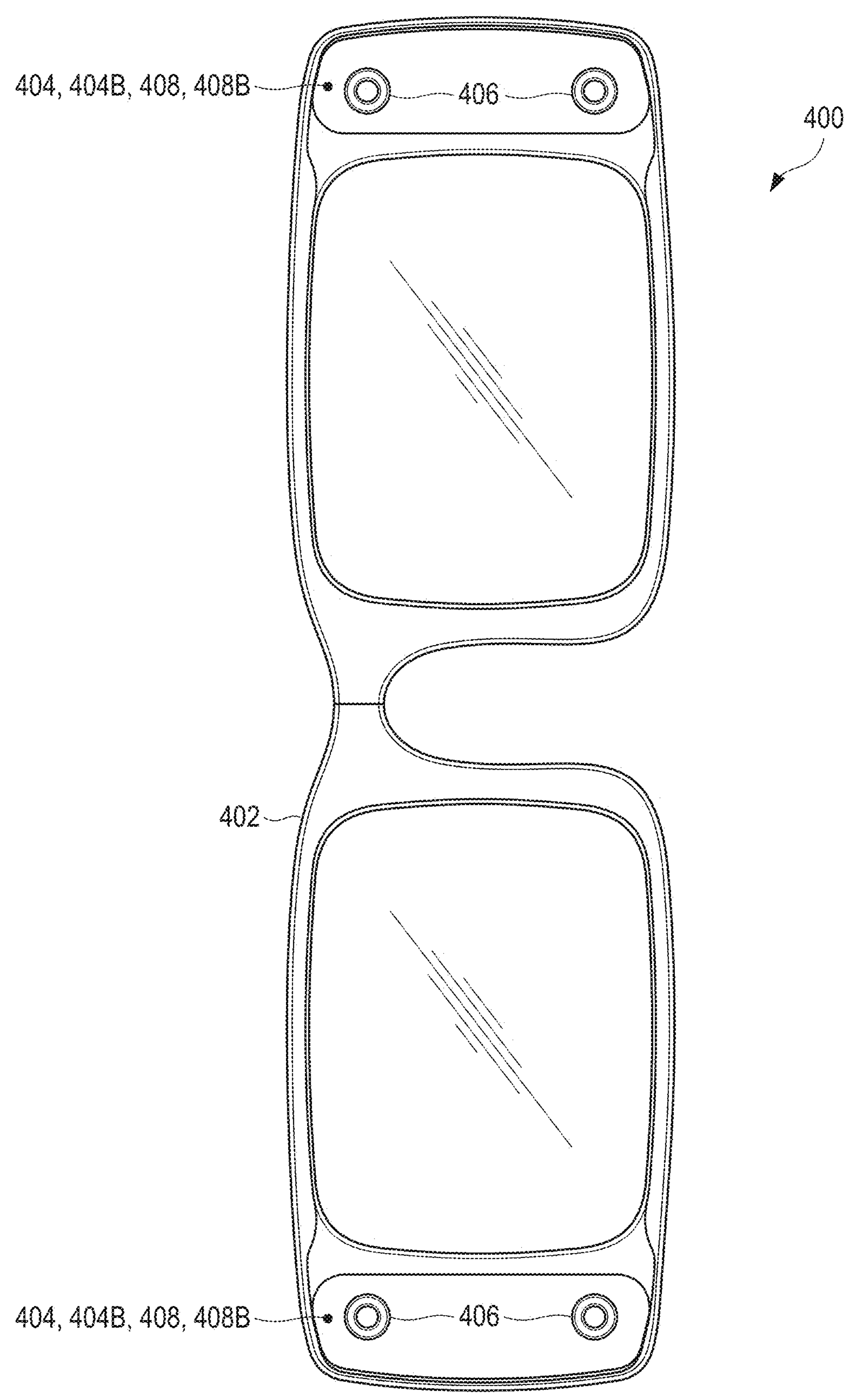
FIG. 5 shows a front view of the augmented reality system of FIG. 4, when the controllably dimmable filter is at least partially transparent in the second filter region.

FIG. 5 shows a front view of the augmented reality system 400 of FIG. 4, when the controllably dimmable filter 408 is at least partially transparent in the second filter region 408B, such as when the camera 406 is activated. The camera 406 can be viewable through the second filter region 408B of the controllably dimmable filter 408 and through the second window region 404B of the window 104B.

Figure 6:
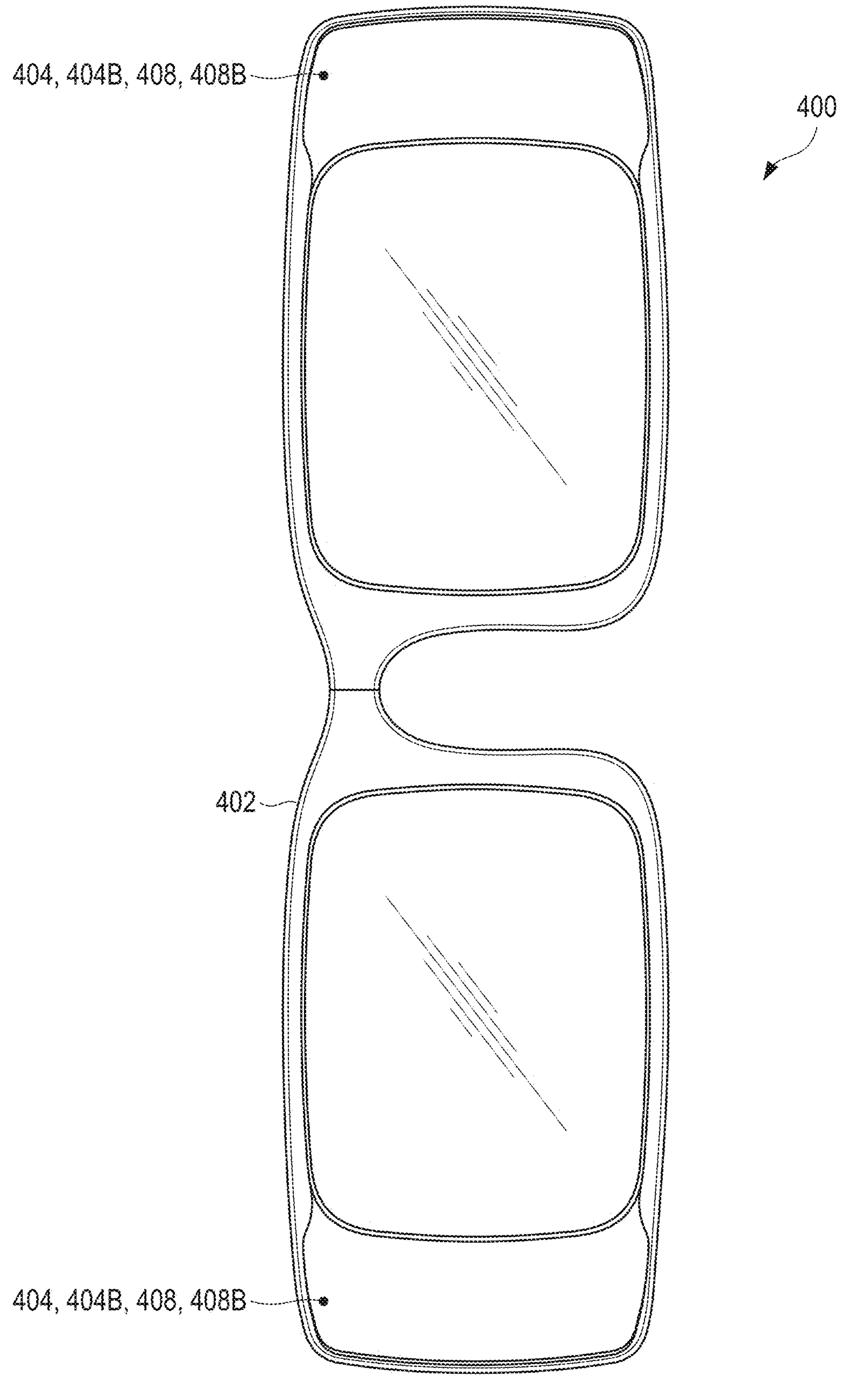
FIG. 6 shows a front view of the augmented reality system of FIG. 4, when the controllably dimmable filter is at least substantially opaque in the second filter region.

FIG. 6 shows a front view of the augmented reality system 400 of FIG. 4, when the controllably dimmable filter 408 is at least substantially opaque in the second filter region 408B, such as when the camera 406 is not activated. The camera 406 may not be viewable through the second filter region 408B of the controllably dimmable filter 408 and through the second window region 404B of the window 104B.

Figure 7:
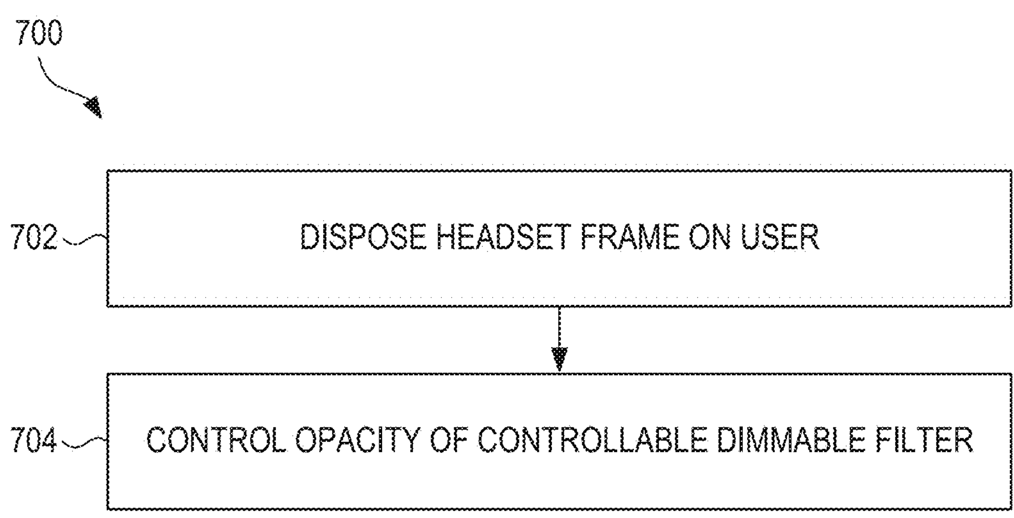
FIG. 7 shows a flow chart of an example of a method for operating an augmented reality system.

FIG. 7 shows a flow chart of an example of a method 700 for operating an augmented reality system, such as augmented reality system 100, augmented reality system 400, or others. The method 700 is but one method for operating an augmented reality system. Other suitable methods can also be used.

At operation 702, the method 700 can include disposing, on a user, a wearable headset frame. The wearable headset frame can include a window disposed in or on the wearable headset frame. The window can include a first window region and a second window region adjacent to the first window region. The first window region can be located such that a field of view of an eye of the user extends through at least part of the first window region. The wearable headset frame can further include a camera disposed in or on the wearable headset frame. The camera can have a field of view directed away from the user and through the second window region.

At operation 704, the method 700 can include controlling an opacity of a controllably dimmable filter located adjacent to the window in the field of view of the eye and the field of view of the camera. The controllable opacity can determine a visibility of the camera through the second window region.

In some examples, when the controllably dimmable filter is at least substantially opaque, the camera may not be visually perceptible through the second window region.

In some examples, the controllable opacity can further determine an amount of light transmitted through the first window region to the eye of the user.

In some examples, the field of view of the eye of the user can at least partially overlap with the field of view of the camera. In some examples, the camera can be located between the user and the controllably dimmable filter. In some examples, the controllably dimmable filter can be located between the user and the window. In some examples, the controllably dimmable filter can be flexible and laminated to the window.

To further illustrate the systems and related methods disclosed herein, a non-limiting list of examples is provided below. Each of the following non-limiting examples can stand on its own or can be combined in any permutation or combination with any one or more of the other examples.

In Example 1, an augmented reality system can comprise: a headset frame wearable by a user; a window disposed in or on the headset frame, the window including a first window region and a second window region adjacent to the first window region, the first window region located such that when the headset frame is worn by the user, a field of view of an eye of the user extends through at least part of the first window region; a camera disposed in or on the headset frame, the camera located such that when the headset frame is worn by the user, the camera has a field of view that is directed away from the user and through the second window region; and a controllably dimmable filter located adjacent to the window and in the field of view of the eye and further in the field of view of the camera, the controllably dimmable filter having a controllable opacity that determines a visibility of the camera through the second window region.

In Example 2, the augmented reality system of Example 1 can optionally be configured such that when the controllably dimmable filter is at least substantially opaque, the camera is not visually perceptible through the second window region.

In Example 3, the augmented reality system of any one of Examples 1-2 can optionally be configured such that when the headset frame is worn by the user, the controllable opacity further determines an amount of light transmitted through the first window region to the eye of the user.

In Example 4, the augmented reality system of any one of Examples 1-3 can optionally further comprise a controller configured to control the opacity of the controllably dimmable filter.

In Example 5, the augmented reality system of any one of Examples 1-4 can optionally be configured such that the controllably dimmable filter includes a first filter region located to determine an amount of light transmitted through the first window region and a second filter region located to determine an amount of light transmitted through the second window region, the first filter region and the second filter region being independently controllable.

In Example 6, the augmented reality system of any one of Examples 1-5 can optionally be configured such that the controller is configured to control the opacity of the controllably dimmable filter such that: when the camera is activated, the controllably dimmable filter is at least partially transparent in the second filter region; and when the camera is not activated, the controllably dimmable filter is at least substantially opaque in the second filter region.

In Example 7, the augmented reality system of any one of Examples 1-6 can optionally be configured such that the controller is configured to control the opacity of the controllably dimmable filter at least in part in response to data corresponding to an image generated by the camera, such that increasing intensity in the image causes the controllably dimmable filter to become more opaque in the first filter region and decreasing intensity in the image causes the controllably dimmable filter to become more transparent in the first filter region.

In Example 8, the augmented reality system of any one of Examples 1-7 can optionally be configured such that the controllably dimmable filter includes a single filter region configured to simultaneously determine an amount of light transmitted through the first window region and determine an amount of light transmitted through the second window region.

In Example 9, the augmented reality system of any one of Examples 1-8 can optionally be configured such that when the headset frame is worn by the user, the field of view of the eye of the user at least partially overlaps with the field of view of the camera.

In Example 10, the augmented reality system of any one of Examples 1-9 can optionally be configured such that when the headset frame is worn by the user, the camera is located between the user and the controllably dimmable filter.

In Example 11, the augmented reality system of any one of Examples 1-10 can optionally be configured such that when the headset frame is worn by the user, the controllably dimmable filter is located between the user and the window.

In Example 12, the augmented reality system of any one of Examples 1-11 can optionally be configured such that the controllably dimmable filter comprises a liquid crystal cell.

In Example 13, the augmented reality system of any one of Examples 1-12 can optionally further comprise an opaque mask that extends circumferentially around the first window region and extends circumferentially around the second window region.

In Example 14, the augmented reality system of any one of Examples 1-13 can optionally be configured such that the controllably dimmable filter is disposed between the opaque mask and the window.

In Example 15, the augmented reality system of any one of Examples 1-14 can optionally be configured such that the controllably dimmable filter is flexible and is laminated to the window.

In Example 16, a method for operating an augmented reality system can comprise: disposing, on a user, a wearable headset frame, the wearable headset frame including a window disposed in or on the wearable headset frame, the window including a first window region and a second window region adjacent to the first window region, the first window region located such that a field of view of an eye of the user extends through at least part of the first window region, the wearable headset frame further including a camera disposed in or on the wearable headset frame, the camera having a field of view directed away from the user and through the second window region; and controlling an opacity of a controllably dimmable filter located adjacent to the window in the field of view of the eye and the field of view of the camera, the controllable opacity determining a visibility of the camera through the second window region.

In Example 17, the method of Example 16 can optionally be configured such that when the controllably dimmable filter is at least substantially opaque, the camera is not visually perceptible through the second window region.

In Example 18, the method of any one of Examples 16-17 can optionally be configured such that the controllable opacity further determines an amount of light transmitted through the first window region to the eye of the user.

In Example 19, the method of any one of Examples 16-18 can optionally be configured such that: the field of view of the eye of the user at least partially overlaps with the field of view of the camera; the camera is located between the user and the controllably dimmable filter; the controllably dimmable filter is located between the user and the window; and the controllably dimmable filter is flexible and is laminated to the window.

In Example 20, an augmented reality system can comprise: a headset frame wearable by a user; a window disposed in or on the headset frame, the window including a first window region and a second window region adjacent to the first window region, the first window region located such that when the headset frame is worn by the user, a field of view of an eye of the user extends through at least part of the first window region; an opaque mask that extends circumferentially around the first window region and extends circumferentially around the second window region; a camera disposed in or on the headset frame such that when the headset frame is worn by the user, the camera has a field of view that at least partially overlaps with the field of view of the eye of the user; a liquid crystal cell located laminated to the window in the field of view of the eye and in the field of view of the camera, the liquid crystal cell having a controllable opacity that determines a visibility of the camera through the second window region; and a controller configured to control the opacity of the liquid crystal cell.

Although the various aspects of the present invention have been described with respect to a preferred embodiment, it will be understood that the invention is entitled to full protection within the full scope of the appended claims.

What is claimed is:

1. A device, comprising:

a headset frame wearable by a user;

a camera disposed in or on the headset frame, the camera located such that when the headset frame is worn by the user, the camera has a field of view that is directed away from the user and through a window region, and a field of view of an eye of the user does not extend through the window region; and a controllably dimmable filter having a controllable opacity that determines a visibility of the camera through the window region.

2. The device of claim 1, wherein when the controllably dimmable filter is at least substantially opaque, the camera is not visually perceptible through the window region.

3. The device of claim 1, wherein when the headset frame is worn by the user, the controllable opacity further determines an amount of light transmitted to the eye of the user.

4. The device of claim 1, further comprising a controller configured to control the opacity of the controllably dimmable filter.

5. The device of claim 4, wherein the controllably dimmable filter includes a filter region located to determine an amount of light transmitted through the window region.

6. The device of claim 5, wherein the controller is configured to control the opacity of the controllably dimmable filter such that:

when the camera is activated, the controllably dimmable filter is at least partially transparent in the filter region; and when the camera is not activated, the controllably dimmable filter is at least substantially opaque in the filter region.

7. The device of claim 5, wherein the controller is configured to control the opacity of the controllably dimmable filter at least in part in response to data corresponding to an image generated by the camera, such that increasing intensity in the image causes the controllably dimmable filter to become more opaque and decreasing intensity in the image causes the controllably dimmable filter to become more transparent.

8. The device of claim 1, further comprising a window, the window including the window region and including a second window region disposed adjacent to the window region, the second window region located such that when the headset frame is worn by the user, the field of view of the eye of the user extends through at least part of the second window region and does not extend through the window region.

9. The device of claim 1, wherein when the headset frame is worn by the user, the field of view of the eye of the user at least partially overlaps with the field of view of the camera.

10. The device of claim 1, wherein when the headset frame is worn by the user, the camera is located between the user and the controllably dimmable filter.

11. The device of claim 1, wherein when the headset frame is worn by the user, the controllably dimmable filter is located between the user and the window region.

12. The device of claim 1, wherein the controllably dimmable filter comprises a liquid crystal cell.

13. The device of claim 1, further comprising an opaque mask that extends circumferentially around the window region.

14. The device of claim 13, wherein the controllably dimmable filter is disposed between the opaque mask and the window region.

15. The device of claim 1, wherein the controllably dimmable filter is flexible and is laminated to the window region.

16. A method, comprising:

disposing, on a user, a wearable headset frame, the wearable headset frame including a window region located such that a field of view of an eye of the user does not extend through the window region, the wearable headset frame further including a camera disposed in or on the wearable headset frame, the camera having a field of view directed away from the user and through the window region; and controlling an opacity of a controllably dimmable filter located adjacent to the window region in the field of view of the eye and the field of view of the camera, the controllable opacity determining a visibility of the camera through the window region.

17. The method of claim 16, wherein when the controllably dimmable filter is at least substantially opaque, the camera is not visually perceptible through the window region.

18. The method of claim 16, wherein the controllable opacity further determines an amount of light transmitted to the eye of the user.

19. The method of claim 16, wherein:

the field of view of the eye of the user at least partially overlaps with the field of view of the camera;

the camera is located between the user and the controllably dimmable filter;

the controllably dimmable filter is located between the user and the window region; and the controllably dimmable filter is flexible and is laminated to the window region.

20. A system, comprising:

a headset frame wearable by a user;

a window region disposed in or on the headset frame and located such that when the headset frame is worn by the user, a field of view of an eye of the user does not extend through the window region;

an opaque mask that extends circumferentially around the window region;

a camera disposed in or on the headset frame such that when the headset frame is worn by the user, the camera has a field of view that at least partially overlaps with the field of view of the eye of the user;

a liquid crystal cell located laminated to the window region, the liquid crystal cell having a controllable opacity that determines a visibility of the camera through the window region; and a controller configured to control the opacity of the liquid crystal cell.

* * * * *